(12) United States Patent
Simmons et al.

(10) Patent No.: US 7,249,737 B2
(45) Date of Patent: Jul. 31, 2007

(54) CELL DOOR SYSTEM FOR AIRCRAFT SECURITY

(76) Inventors: David Simmons, 1211 Douglass La., Sevierville, TN (US) 37876; Franklin R Bell, 3521 Cunningham Rd., Knoxville, TN (US) 37918

( * ) Notice: Subject to any disclaimer, the term of this patent is extended or adjusted under 35 U.S.C. 154(b) by 250 days.

(21) Appl. No.: 10/900,166

(22) Filed: Jul. 28, 2004

(65) Prior Publication Data

US 2006/0032977 A1    Feb. 16, 2006

(51) Int. Cl.
    *B64C 1/14*    (2006.01)
(52) U.S. Cl. .............................. 244/129.5; 244/129.4; 49/41
(58) Field of Classification Search ............. 244/118.5, 244/118.6, 129.5; 49/41, 40, 139, 140
    See application file for complete search history.

(56) References Cited

U.S. PATENT DOCUMENTS

| 3,658,277 | A  | * | 4/1972  | Anderson ................ 244/1 R |
| 6,375,562 | B1 | * | 4/2002  | Hein ...................... 454/188 |
| 6,470,512 | B1 | * | 10/2002 | Lau et al. .................. 4/612 |
| 2002/0175245 | A1 | * | 11/2002 | Sheremeta ............. 244/118.5 |
| 2003/0146347 | A1 | * | 8/2003  | Roessner et al. ....... 244/129.5 |
| 2004/0089766 | A1 | * | 5/2004  | Semprini ............... 244/118.5 |
| 2005/0230550 | A1 | * | 10/2005 | Dominguez ........... 244/129.5 |

* cited by examiner

*Primary Examiner*—Michelle Clement
*Assistant Examiner*—Benjamin P. Lee

(57) ABSTRACT

A generally cylindrical security door module is designed for retrofit into the passageway of an aircraft leading to the cockpit. Two doors, forward and aft, are provided which are mounted for opening and closing upon commands emanating from the cockpit. Both doors are normally closed and only one normally opens at a time. A candidate for entrance to the cockpit is permitted to enter the module when the cockpit personnel open the aft door, which is then closed. Sensing apparatus may be employed to establish the identity and clearance of the candidate. Upon approval, the cockpit personnel open the forward door to admit the candidate. Emergency release apparatus is also described.

5 Claims, 14 Drawing Sheets

FIG. 7
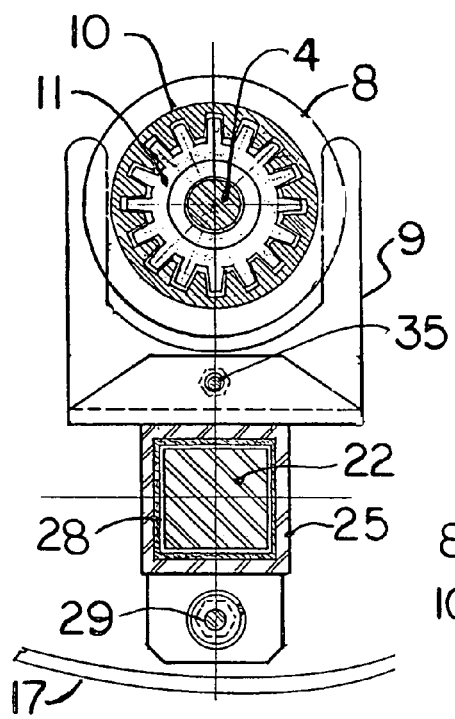
FIG. 7C
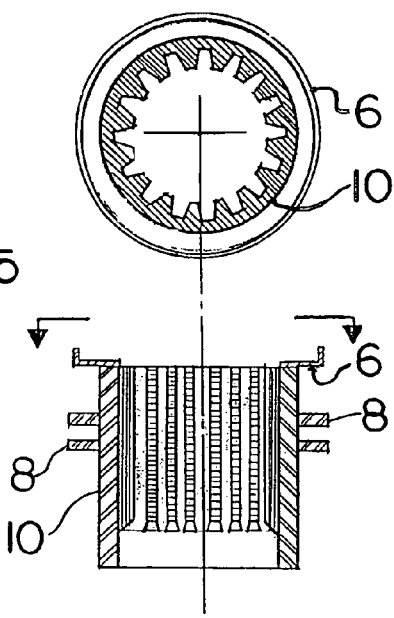
FIG. 7D
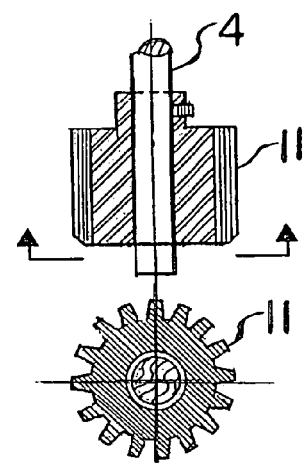
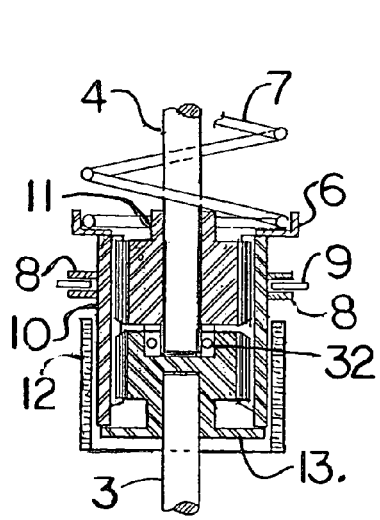
FIG. 7A
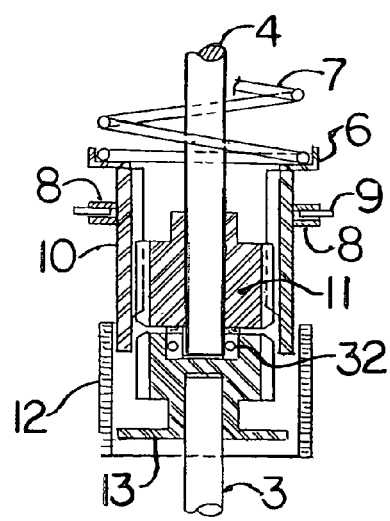
FIG. 7B
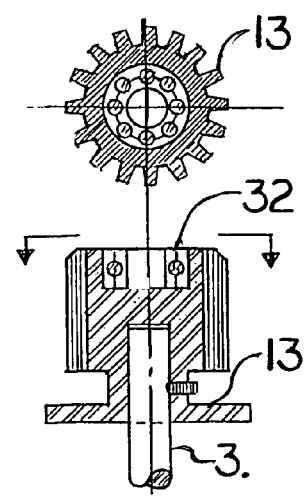
FIG. 7E FIG. 8
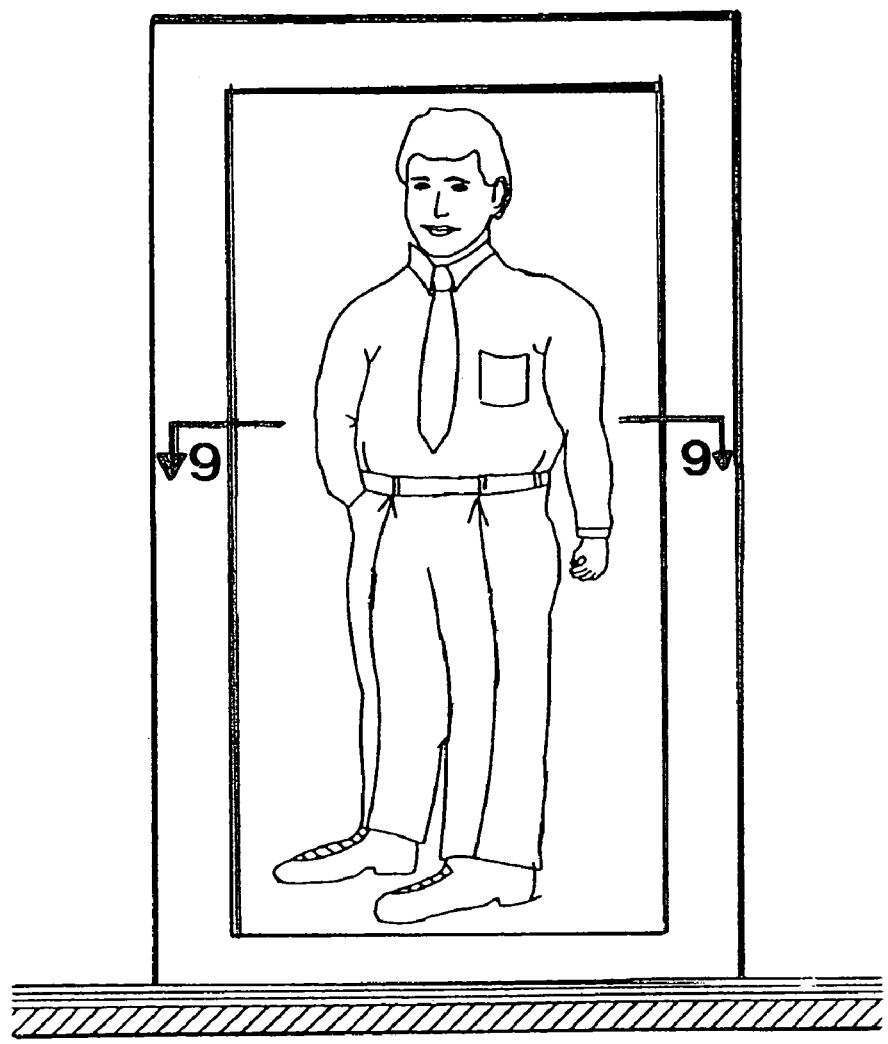
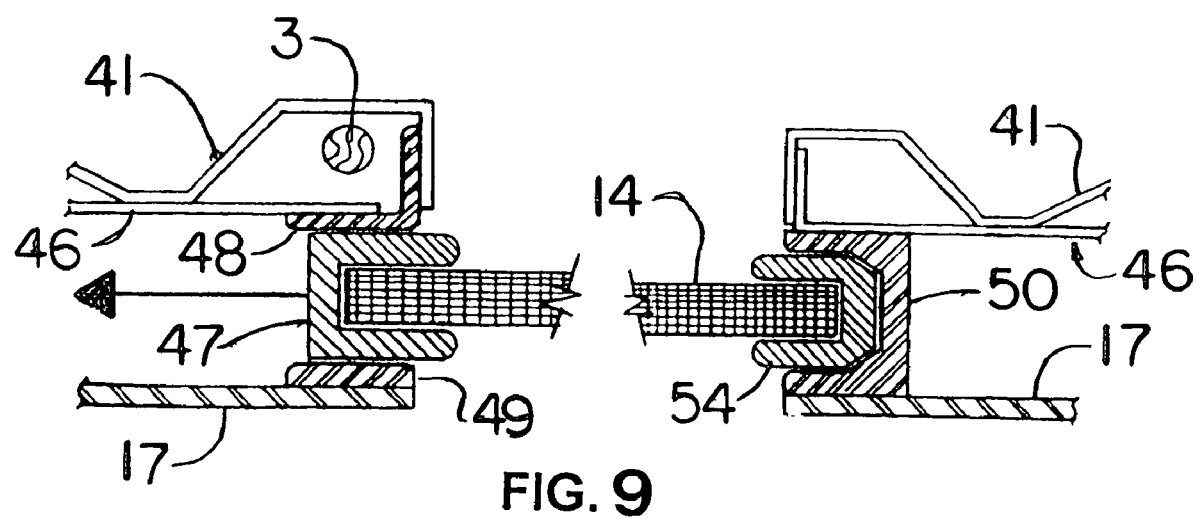
FIG. 9

CELL DOOR SYSTEM FOR AIRCRAFT SECURITY

CROSS-REFERENCE TO RELATED APPLICATIONS

Not Applicable

STATEMENT REGARDING FEDERALLY SPONSORED RESEARCH

None Applicable

REFERENCES TO SEQUENCE LISTINGS, TABLES OR COMPUTERS

None

PROGRAM LISTINGS, COMPACT DISK APPENDIX

None

BACKGROUND OF THE INVENTION

In recent years people with antisocial aberrations have undertaken lethal hijackings of aircraft resulting in severe losses of life and property. Among the solutions to this problem which have been advanced are strengthened physical security at airports, various baggage security techniques, the introduction of armed air marshals on flights, arming of pilots, and strengthening of cockpit doors. The latter procedure has proven effective in incidents which have occurred since the recent emphasis on the process of "hardening" aircraft doors, but it is apparent that the brute force solution of requiring a plurality of iron bars to be built into the doors for hardening, while effective against a frontal assault, does not protect against missiles tossed into the cockpit, and adds an undesirable amount of unproductive weight to the aircraft, inhibiting performance and reducing the potential payload.

DISCUSSION OF THE PRIOR ART

Security doors and cells (robber traps) are well known in the patent literature with respect to static structures such as financial and retail institutions, with variations on the theme of two remotely controlled lockable doors, or revolving doors which lock in position to prevent a robber's escape. Given terrestrial installation, the design of such cells is usually dominated by commercial considerations to disguise the cell to appear as open and inviting as possible so as not to discourage the entry of the general public who wish to do business with the establishment. Precluding claustrophobia is a major terrestrial design consideration since the very idea of a security cell tends to inhibit people from coming through the cell on their way into a store or bank. Illustrative of the terrestrial security cylindrical cell art, see U.S. Pat. No. 6,073,394, to Uhl, and U.S. Pat. No. 5,181,018, to Cowie.

SUMMARY OF THE INVENTION

This invention relates to a cylindrical module which may be retrofit into the passageway of an aircraft which communicates between the cockpit and the passenger cabin. The cylindrical module, installed as fixed to the aircraft structure, is provided with two apertures, one facing into the cockpit and the other facing into the passenger cabin. A pair of arcuate doors (i.e. arcuate conformably to the cylindrical arc of the module) are slidably mounted into the apertures on tracks and are connected to remotely-controlled driving means which enable the doors to slide back along the cylinder walls. The doors are normally closed. In operation the captain of the aircraft in the cockpit opens the aft door from the passenger cabin in response to a request from a candidate for entrance, whereupon the candidate enters the interior of the cylindrical module and the aft door closes behind the candidate. The module would be equipped with a variety of readers, sensors and detectors to examine the candidate for identity and absence of weapons. When the captain is content that the candidate has cockpit business and is authorized for entry, the forward door is opened and the candidate is permitted to enter the secure cockpit.

Transplanting the security cell into an aircraft presents a number of special considerations. Unlike the terrestrial application, the weight of the airborne security cell must be carried for the entire duration of flight as a continuing drain on the power supplied by the aircraft engines, so it must be lightweight. Space is at a premium since the aircraft has already been designed and configured to use virtually all the space between the cockpit and the passenger cabin, so a retrofit module must be capable of fitting into a narrow, predetermined space and shape. Crew are themselves chosen in part for their compact size and shape and are typically subject to weight limits. It is desirable that the chamber defined by the cylinder be small enough to admit only one person at a time, thereby discouraging hostage taking and contributing to the compactness of the design. Even for aircraft designs with ample space in the passageway to the cockpit, it is preferred that the cylindrical security module of our invention be kept small enough to permit passage through the cell of only one person at a time. The aircraft may be operated in abnormal attitudes so the direction of verticality may be, or seem to be, displaced. Even in normal operations, the mechanisms of the cell may be subjected to abnormal gravitational, centrifugal and centripetal forces, but they must nevertheless continue to work effectively and without delays. Finally, given the rigors of aircraft operation, failure of the security system cannot be tolerated and hence immediately-operable manual overrides must be provided to permit prompt ingress and egress.

Thus it is an object of this invention to provide an easily retrofittable module for effective secure access control for aircraft cockpits.

It is a further object of this invention to provide a security module for aircraft which has simple and uncomplicated design and construction.

It is a further object of this invention to provide a lightweight security module for use in aircraft.

It is a further object of this invention to provide a security module for aircraft with minimal to moderate power consumption requirements.

It is a further object of this invention to provide a security cell for aircraft which fits into space which is available within the existing configuration of the aircraft.

It is a further object of this invention to provide a security cell for aircraft which blocks line-of-sight openings between the cockpit and the passenger cabin during operation of the aircraft.

It is a further object of this invention to provide a security cell for aircraft which, although small enough to be retrofit, nevertheless offers ample space for readers, sensors and detectors to test the acceptability of a candidate who presents for admission.

It is a further object of this invention to provide a security cell for aircraft, which adapts proven security techniques and design considerations for airborne use.

It is a further object of this invention to provide a security cell for use in aircraft which can be relied upon to be operable despite being subjected to abnormal gravitational, centripetal or centrifugal forces.

It is a further object of this invention to provide a power operated airborne security cell which has manual override features to permit quick and convenient egress in case of power failure.

It is a further object of this invention to provide a retrofittable aircraft security module which, when designed for retrofit into a specific aircraft model, can be quickly installed during routine maintenance so as to minimize the time delay in getting the aircraft back into service.

It is a further object of this invention to provide a security module for aircraft made from bullet-resistant materials and which is resistant to other forms of mechanical attack.

It is a further object of this invention to provide a cylindrical airborne security module with rack and pinion drive means for selectively and smoothly driving arcuate doors for opening and closing access apertures in the cylindrical module.

It is a further object of this invention to provide a cylindrical security module for aircraft which may serve as an entrapment mechanism for hijackers seeking entry to the cockpit, and which is tamper resistant to preclude escape of a hijacker so entrapped.

It is a further object of this invention to provide a security module for airborne application which is readily and easily serviceable by maintenance and security personnel.

It is a further object of this invention to provide an airborne security module with identification and testing means, of sufficiently small size as to preclude easy admission to the interior of the module by more than one person at a time.

Those skilled in the art will readily appreciate that many of the substantial and distinguishable structural functional abilities and advantages disclosed herein represent significant advances over the prior art and that individual features disclosed herein may be applicable in the field of secure access control for ground applications as well as for airborne applications.

The foregoing and other objects of the invention can be achieved with the present invention, device and system which is a cell door system principally for aircraft security.

The invention, in a broad sense, is provided as a security cell system having mechanical drive means, two door panels and a selectively operable geared disconnect assembly, for engaging and disengaging the door panels in relation to the drive means; therefore providing respective opening and closing movements along a displacement path and selective access to the cockpit secured area. The invention may be installed and utilized in an aircraft, or similar, structure, such as an adjacent or proximately located support structure for an aircraft of other structure close to or for use while servicing an airplane.

The security cell system is provided with a cylindrical containment cell area having two substantially parallel partitioned inner compartment walls that form a short internal hallway between the two arcuate sliding door panels. The door panels are secured in place between two semicircular grooved tracks, one such grooved track that supports the bottom of both door panels while the other grooved track secures the tops of the door panels. The tracks may be thought of as circular for convenience only, since they might as easily be two semicircular tracks, each of which permits excursion of a door panel through a 180° arc, and there is no need for the two semicircular track sections to be coextensive as a 360° circle, nor that the two semicircular track members share a common central axis. The bottom ends and the top ends of the two arcuate doors are v-shaped along the curved surface to match the grooves in the (semi-) circular tracks, the upper track and the lower tracks having substantially the same arcuate radii as the corresponding door panels.

The doors 14 are fabricated preferably from bullet-resistant material such as Kevlar™ or other lightweight, composite, bullet-resistant material, to preclude attempts to deliver bullets or other missiles from the passenger cabin into the cockpit.

Each of the two door panels is provided with one lower arcuate rack and one upper arcuate rack attached to the inside of each door. Each door is provided with a long, vertical shaft having upper and lower pinions mounted thereon to mesh with the lower and upper arcuate racks for driving the doors respectively to their open and closed positions. The vertical shaft, with pinions, is provided to assure that the doors are driven at both the top and bottom for even driving pressure to prevent the doors from binding in the course of their opening/closing excursions. Reference here to vertical, top, or bottom, assumes the cell, and the aircraft, are at rest on the ground. Since, in flight, the cell will be in whatever attitude the aircraft is in, the G forces acting on the cell and its components, may be varied and strong.

The interior of the security cell has substantially parallel sides, substantially flat panels which extend generally from the top of the interior chamber to the bottom. A top down cutaway view would show that the inside of the flat panels define a chamber, or an equipment bay, with the inside wall of the module, and within the equipment bay, an assortment of readers, sensors and detectors may be installed, as well as an array of gas dispensers, electronic stun apparatus, or other means for subduing a hijacker. The vertical shafts which carry the pinions which drive the doors to their open and closed positions, are also concealed behind these flat panels.

The opening and closing power derives from small electric motors powered by the aircraft's electric power system, and mounted advantageously in a ceiling chamber of the module. The power is transmitted to the drive shaft through a power train which includes a worm gear, an arrangement which is very difficult to reverse, and thereby making the system virtually impervious to attempts by the person inside the cell to open or reopen the door once inside by pushing on the door. The door is smoothly formed, precluding handholds which might give purchase in an attempt to move the door sideways. The module has therefore additional utility in being useful as a detainment cell pending landing of the aircraft so that the inhabitant of the cell can be turned over to ground security personnel.

The module may be further arranged to keep at least one of the doors closed at all times while the aircraft is in operating mode, i.e., loading, taxiing, flying, landing, and unloading. This feature prevents an attacker from having an opportunity to present missiles, e.g., bombs, explosives, gas canisters, gunfire or other hazardous items from being thrown or delivered from the passenger compartment into the cockpit during critical moments in the operation of the aircraft.

The pilot has total control of the security module, as all control mechanisms are operable solely from the cockpit, including emergency releases.

BRIEF DESCRIPTION OF THE DRAWINGS

FIG. 7(a) Vertical section through the emergency door release showing the spline sleeve coupling fully engaged with the lower shaft gear for normal operation.

FIG. 7(b) Similar to (a) but with the spline sleeve coupling raised to disengage from the lower shaft gear, leaving the doors free to rotate for manual operation in emergency door release mode.

FIG. 7(c) Horizontal section of FIGS. 5 and 6 showing the lifting fork which disengages the spline sleeve coupling from the lower shaft gear.

FIG. 7(d) Detail of spline sleeve coupling shown in vertical and horizontal cross section.

FIG. 7(e) Detail of the drive line components from the upper drive shaft to the lower drive shaft showing the respective parts which achieve smooth engagement/disengagement of the drive mechanism.

FIG. 8. Illustration of a candidate inside the module with both doors closed, waiting for the cockpit (forward) access door to be opened for admission into the secure cockpit space.

FIG. 9 Horizontal section showing the configuration of the left and right door frames when the door is closed.

DESCRIPTION OF THE PREFERRED EMBODIMENT

Figure 1:
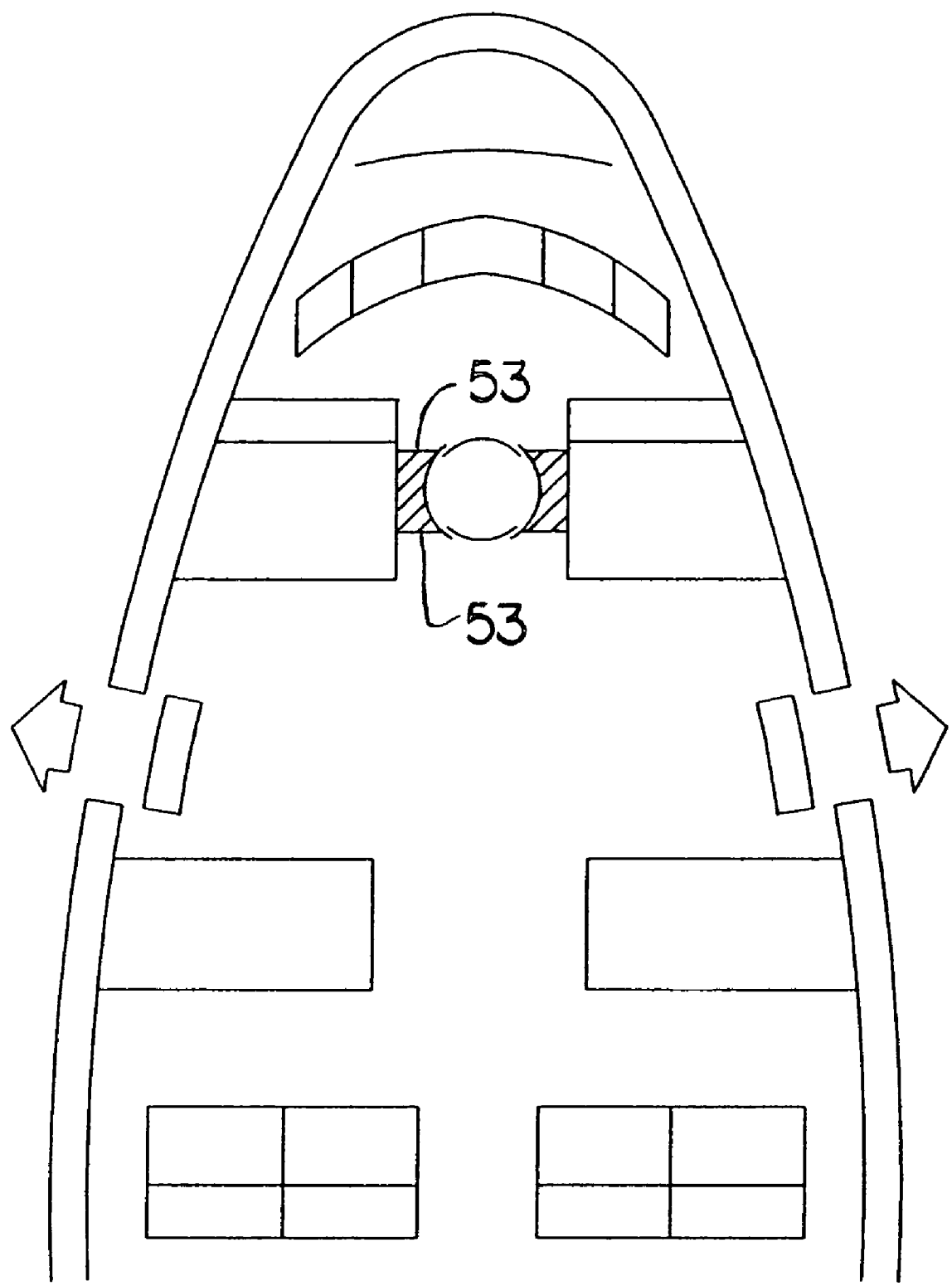
FIG. 1: A plan view of the front section of an aircraft giving an overall view of how a security module after our invention would be retrofit into the passageway between the cockpit and the passenger cabin of an aircraft.

The retrofittable security door module of our invention is preferably installed in the passageway between the cockpit and the passenger cabin of an airliner as shown in FIG. 1.

The module is attached to the aircraft by custom brackets, or even wall sections 53 which are fabricated as necessary to interface with a particular aircraft configuration. These brackets will typically be consistent over a plurality of individual aircraft of the same model, thereby affording a measure of repetitivity in manufacturing of the brackets. Other components of the module are designed to be interchangeable over substantially all aircraft into which they might be installed.

Figure 2:
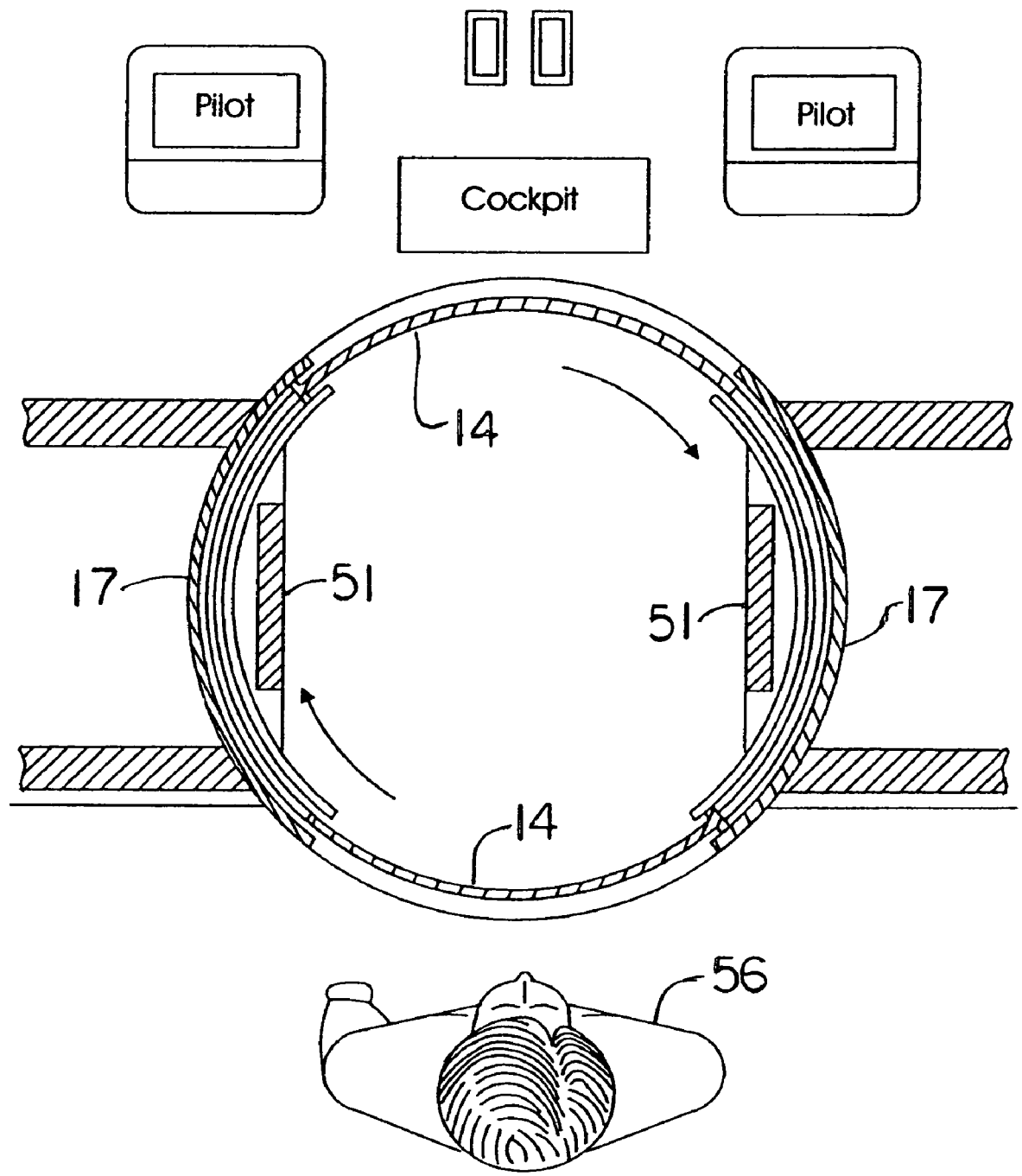
FIG. 2. Enlarged view of the center portion of FIG. 1, showing a cross section of our module with both doors closed and a candidate for admission approaching the rear door of the module.
Figure 3:
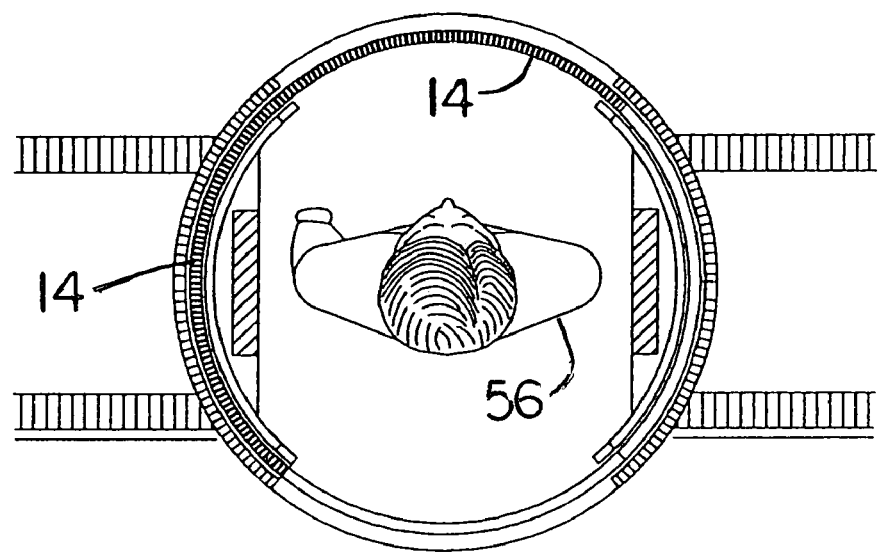
FIG. 3. Same as FIG. 2, but the rear door has opened and the candidate has taken station inside the module.
Figure 4:
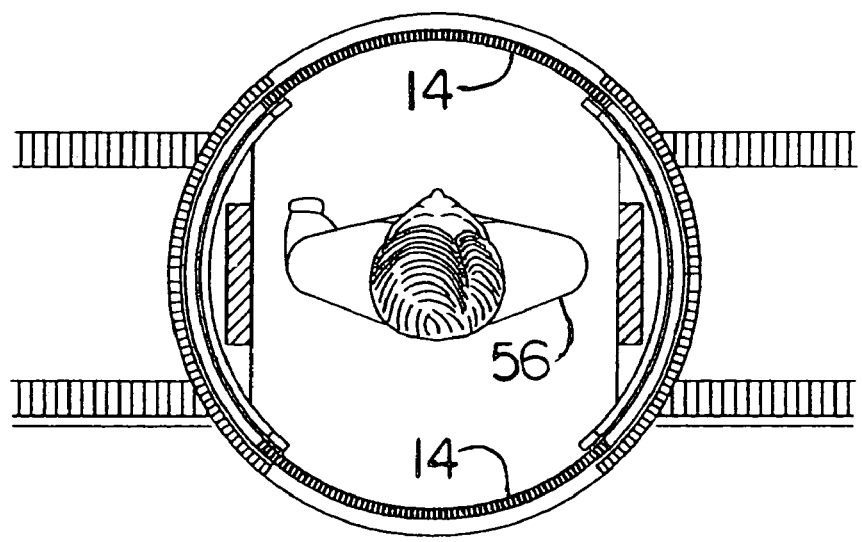
FIG. 4. Same as FIG. 3, but the rear door has closed around the candidate.

In operation, a candidate 56 for admission to the cockpit, is shown in FIG. 2 approaching the security module rear door 14. The candidate 56 is admitted to the module when a pilot activates the control which opens the arcuate door 14, causing the door 14 to be driven into a recess between in inner and outer walls of the module, permitting the candidate 56 to enter the module, as seen in FIG. 3. Once inside the module, the door 14 closes, as shown in FIG. 4. While enclosed in the module, the candidate may be examined by a plurality of instruments which are installed in the equipment bays 51. These may include video, card readers, retina scanners, magnetic weapons detectors, fingerprint readers, and such other scanning and reading devices as may be appropriate for identification and authentication of the candidate 56, or as might be required to fulfill the security protocols of the organization which operates the aircraft. In addition to identification apparatus, the equipment bays may contain apparatus for gaseous discharges or electronic stun equipment for disabling the candidate 56 if that person should prove to be an attacker.

Figure 5:
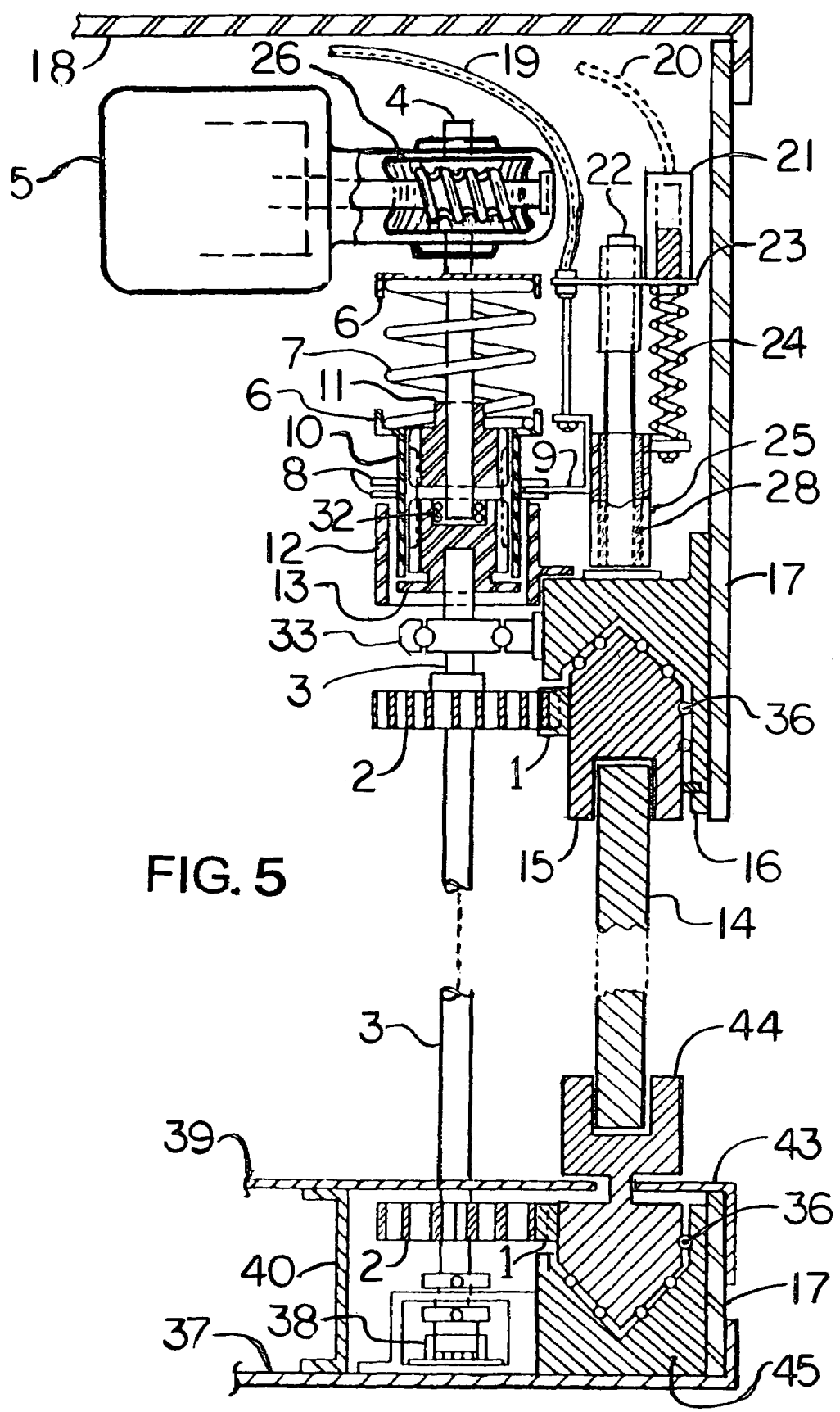
FIG. 5. Cutaway cross section side view showing the motor, drive shaft, disengagement lift, upper track, door with upper arcuate rack engaged with the upper pinion, and in the lower portion of the drawing, the lower part of the door with the lower arcuate rack engaged with the lower pinion, and the lower track.

With reference now to FIG. 5, it may be seen that the doors 14 are held in place between upper 15 door frame guides and lower 44 door frames. Both the frame members 15 and 44 are provided with V-shaped edges which are cooperatively positioned into the inverted V-shapes formed in the upper 16 and lower 45 track members and are rollably separated from them by the bearings 36.

The lower frame member 44 is provided with a groove into which the closure plate 43 fits to provide a loose seal sufficient to prevent substantial particles from falling through into the track and drive mechanisms below.

Both the door frames 15 and 45 are provided with arcuate rack sections 1 conforming to the arcuate shape of the doors 14. The rack sections 1 are meshed cooperatively with pinion gears 2 which are mounted respectively at the upper and lower portions of drive shaft 3, at locations which are respectively above the ceiling and below the floor of the candidate reception chamber. Drive shafts 3 are held in position at the upper end by stabilizing bearings 33 which are attached to the upper door tracks 16, and are held at the lower end by the bearing assemblies 38 which are attached to the base of the module.

Colinear with each lower drive shaft 3 and above it, are upper drive shafts 4, driven by a worm 26 and worm gear arrangement powered by motors 5. The upper drive shaft 4 is held in decoupleable engagement with the lower drive shafts 3 by springs 7 and splines 10. The decoupling mechanisms will be explained in greater detail below with respect to FIG. 7(*a*) to (*e*). The decoupling mechanism is activated in the absence of power by the manually operated release cable 19, or if power is available by the door release cable 20 which operates the solenoid 21.

Figure 6:
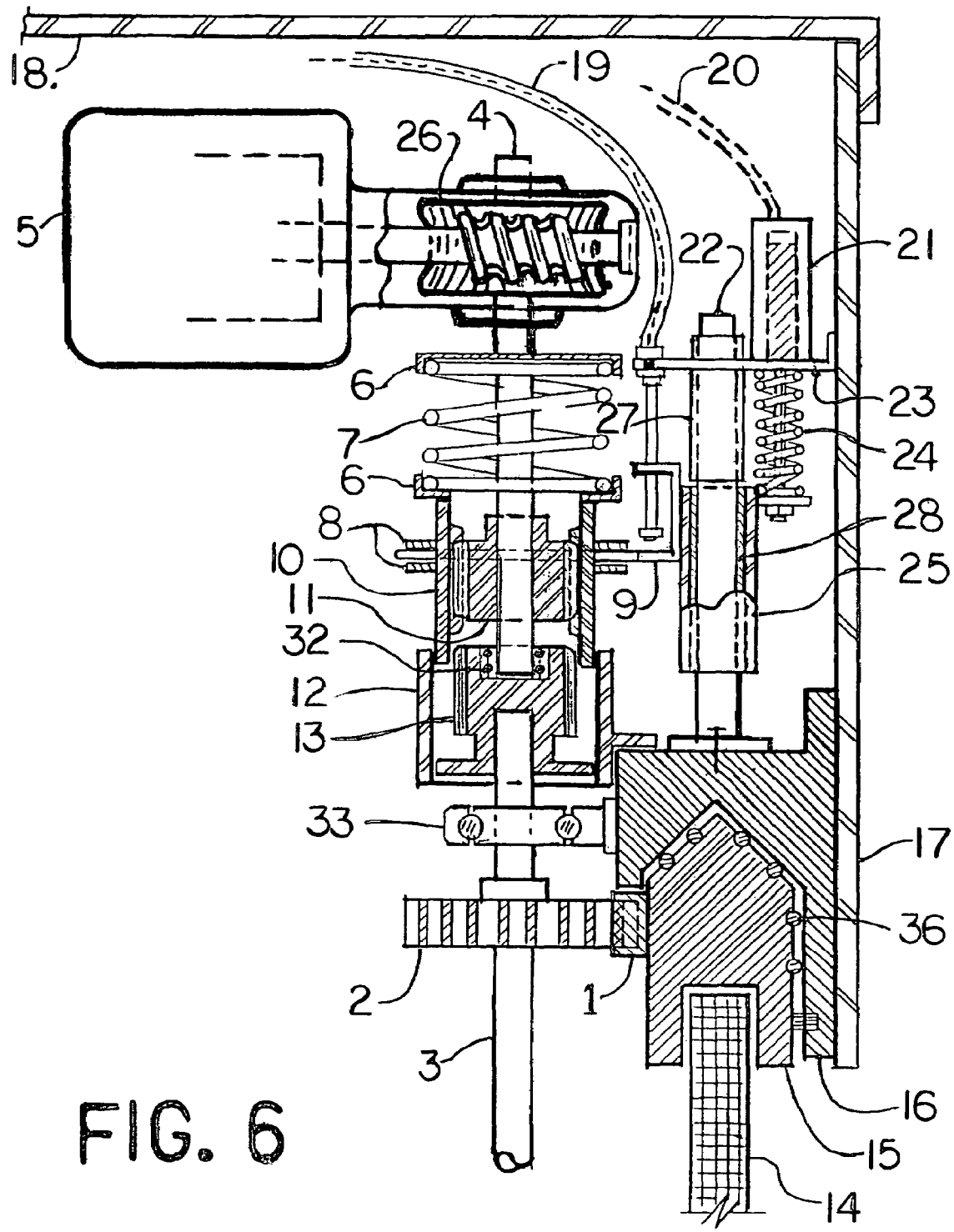
FIG. 6. An enlarged portion of the upper part of FIG. 5 showing the driver clutch lifted out of engagement with drive shaft.

FIG. 6 shows the upper part of the same sectional view as FIG. 5, but the mechanism is in reaction to a power-on door release signal. Upon receipt of an electrical charge delivered through the electric cable 20, solenoid 21 is activated, drawing the shift fork sleeve 25 upward along the shift fork sleeve shaft 22 and carrying the shift fork 9 upward to lift the spline sleeve coupling 10 up and clear of the lower shaft gear 13, thereby leaving the lower drive shaft 3 free to turn and permitting the door to slide freely to any desired position. The shaft 22 and solenoid 21 are securely affixed to the support bracket 23 which is secured to the exterior wall 17. Also held by the bracket 23 is the sleeve 27 which guides the travel of the shift fork sleeve shaft 22. The solenoid 21 is held in its normal position, when not activated, by the spring 24.

Alternatively, manual activation of the release cable 19 can draw the lifting fork 9 upward to achieve disengagement of the spline sleeve coupling 10 from the lower shaft gear 13, with the same result.

It may be seen in FIG. 7(*a*) that when operationally coupled together, collinear drive shafts 3 and 4 are connected by means of the upper shaft gear 11 which is attached to shaft 4 to rotate as shaft 4 rotates. When coupled, shaft 4 is received in the lower shaft gear 13 by the pilot bearing 32. The upper shaft gear 11 is attached to the spline sleeve coupling 10 and the splines of the coupling 10 fit down over the teeth of the lower shaft gear 13. As seen in FIG. 7(*b*), when the lifting fork 9 raises the spline sleeve coupling 10 to disengage from the lower shaft gear 13, the coupling connection between the upper drive shaft 4 and the lower drive shaft 3 is broken and the associated door 14 is free to move.

Operation of the lifting fork 9 is best understood with reference to FIG. 7(*c*) where the fork 9 is engaged with the coupling sleeve 10. The fork 9 is carried by the hollow square cross sectioned shift fork sleeve 25 which rides on the shift fork sleeve shaft 22, separated from it on all four sides by the sleeve bushing 28.

The spline sleeve coupling 10 is illustrated in FIG. 7(*d*), where the coupling 10 holds the spring retainer 6 and the bumper rings 8 are provided to form a groove to securely receive the lifting fork 9.

In FIG. 7(*e*) the arrangement for driveable connection between drive shafts 4 and 3 is illustrated. Note from comparison of FIGS. 7(*a*) (engaged) and 7(*b*) (disengaged), the shafts 3 and 4 are in collinear, tandem juxtaposition, and the engagement is achieved through the spline sleeve 10 which is moved up to disengage and down to engage. Even when disengaged, the shaft 4 spins fruitlessly in the pilot bearing 32 which is secured within the lower shaft gear 13 to maintain the colinearity between the shafts 3 and 4.

FIG. 8 shows a candidate for admission to the cockpit secure area standing in the interior of the security cell with orientation arrows identifying the location of the cross sectional view of FIG. 9. The arcuate doors are shown for convenience in FIG. 9 as though they were planar rather than arcuate. The doors 14 fit into a door frame 47. When fully driven to the end of its excursion, the door frame, comprising an after section 47 and leading section 54, which is shaped to complement the shape of the door stop 50, comes to rest against the door stop 50. The door frame 47 is lightly in contact with door spacer 49 which is adhered to the exterior cylinder wall 17 on one side, and is similarly lightly in contact with the angle door spacer 48 on the other side. The angle door spacer 48 is adhered on one side to the intermediate wall 46 and on the other to the interior wall panel 41. It may be seen that the interior wall panel 41 defines a cavity in which the lower drive shaft 3 is enclosed.

Figure 12:
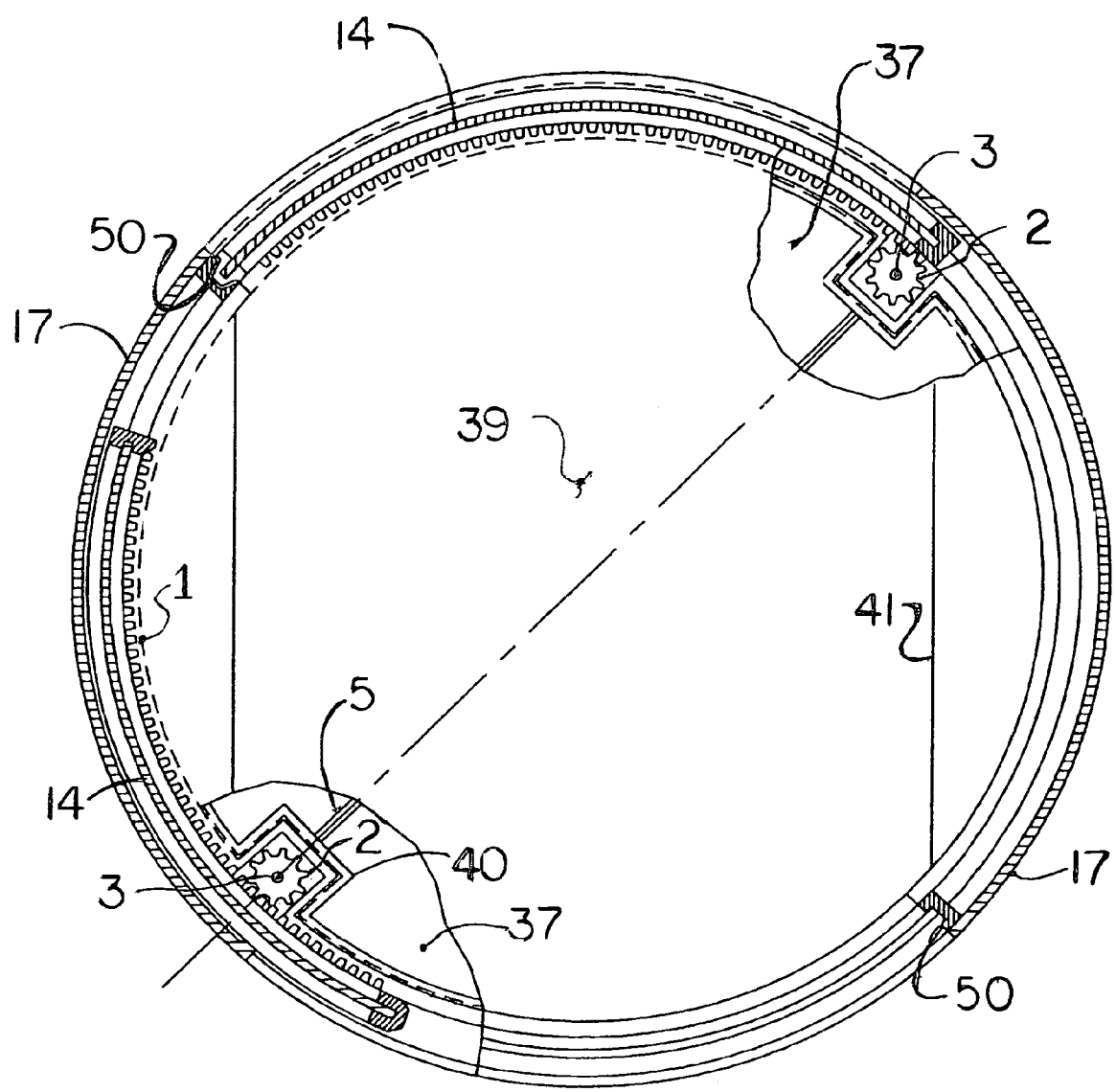
FIG. 12. Like FIG. 10, but with cutouts showing the lower drive pinions engaged with the arcuate racks on the lower edge of the doors. One door is shown partly open for clarity.
Figure 13:
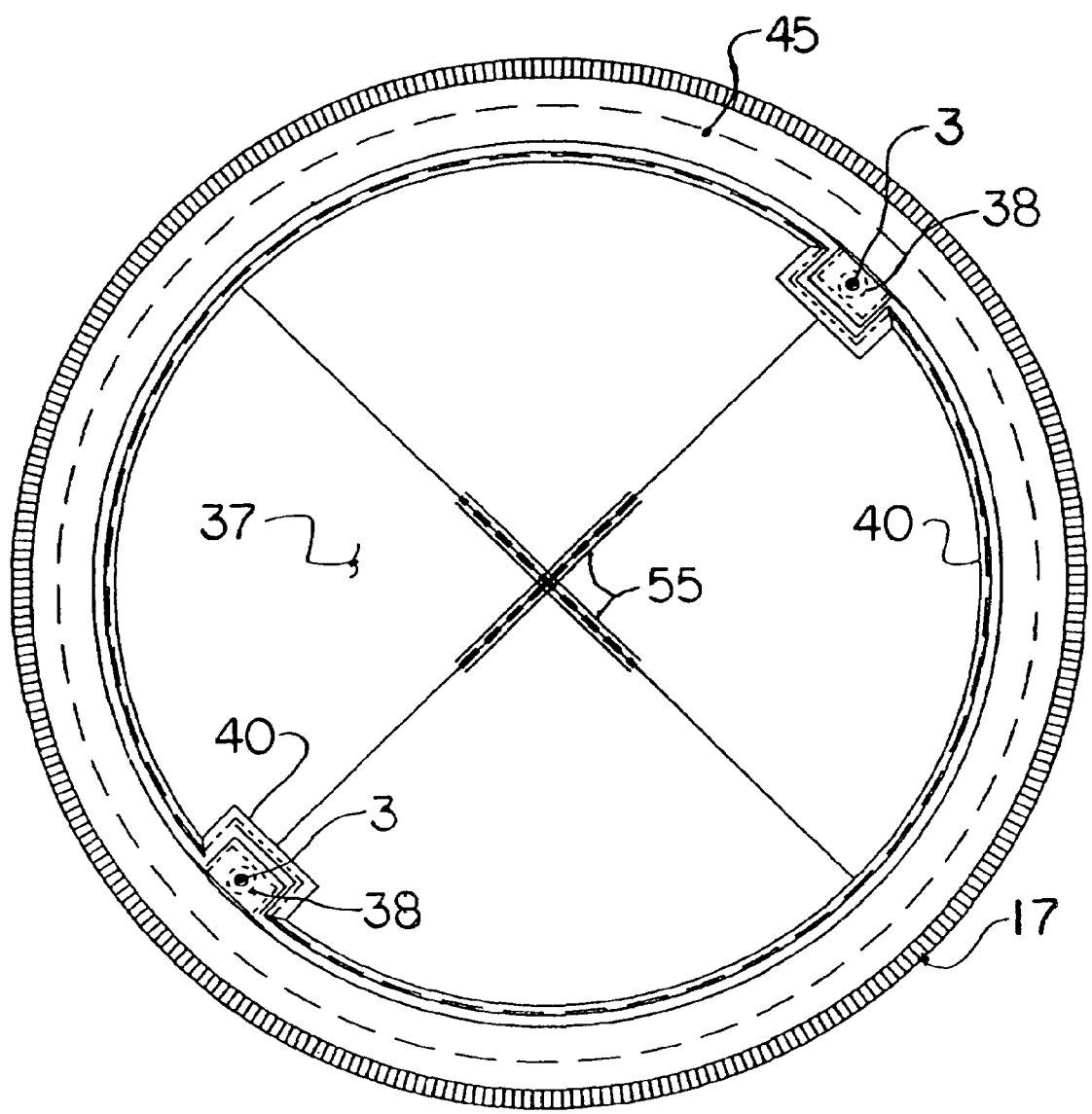
FIG. 13. Horizontal section of the sub floor plate, beneath the floor plate shown in FIG. 10. Shows the bearing assemblies which support the long vertical drive shafts. Also shows the central support members provided for stability of the unit in its connection to the floor of the aircraft.
Figure 14:
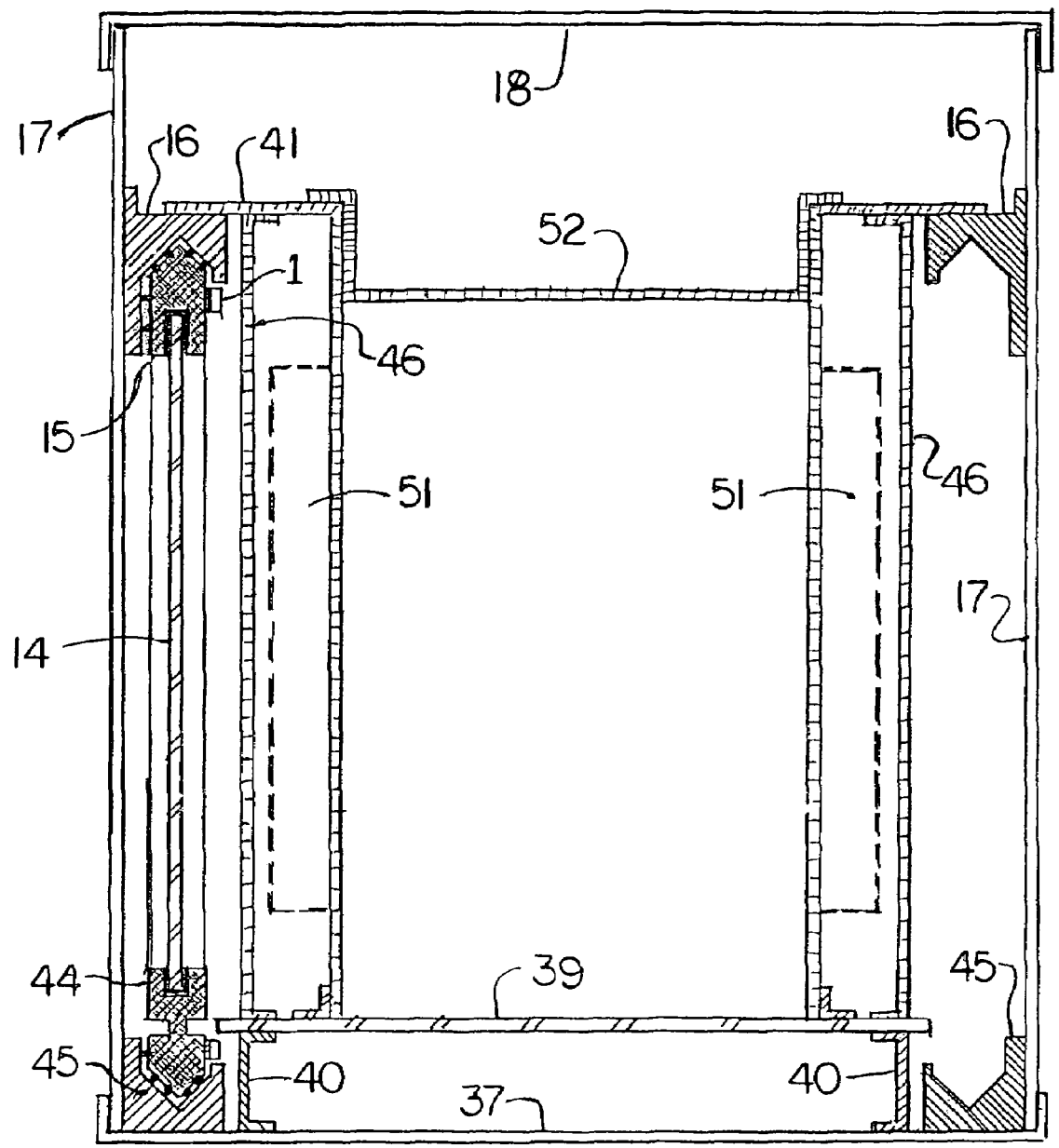
FIG. 14. Vertical schematic sectional view (not to scale) through the security module showing the general juxtaposition of the respective major portions of the module.

With reference now to FIG. 14, it may be seen that the next series of drawings, FIGS. 10, 11, 12, and 13, are cross sections of the module of our invention at the respective levels and from the respective directions therein indicated.

Figure 10:
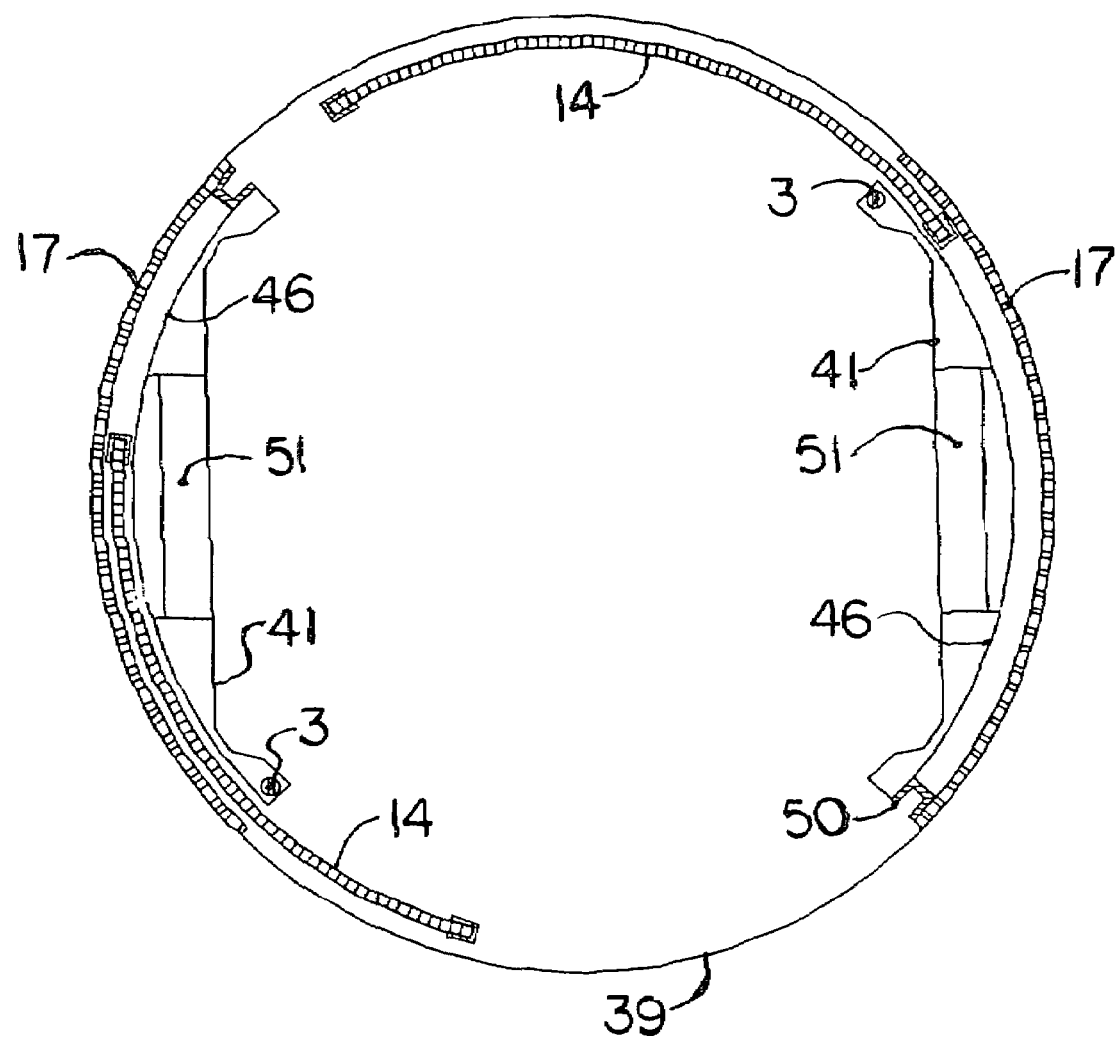
FIG. 10. Horizontal section showing the floor plate. Both doors are shown partly open for clarity, but in practice at least one door would be fully closed while the aircraft is operational.

FIG. 10 is a cross section through the lower central portion of the security module looking down. The doors 14 are shown in their true arcuate configuration, and are depicted partially open for clarity. It will be appreciated that while the aircraft is in operation at least one of the doors 14 will be in the closed position at all times. The doors 14 are driven into and out of the recessed pockets which are defined between the exterior walls 17 and the intermediate walls 46, by the rack and pinion arrangement previously discussed, under the positive drive forces transmitted through the lower drive shaft 3. The interior walls 41 define the equipment bays 51 in which may be mounted such readers, sensors, detectors, dispensers and other security apparatus as may be chosen for the security design of the aircraft owner.

Figure 11:
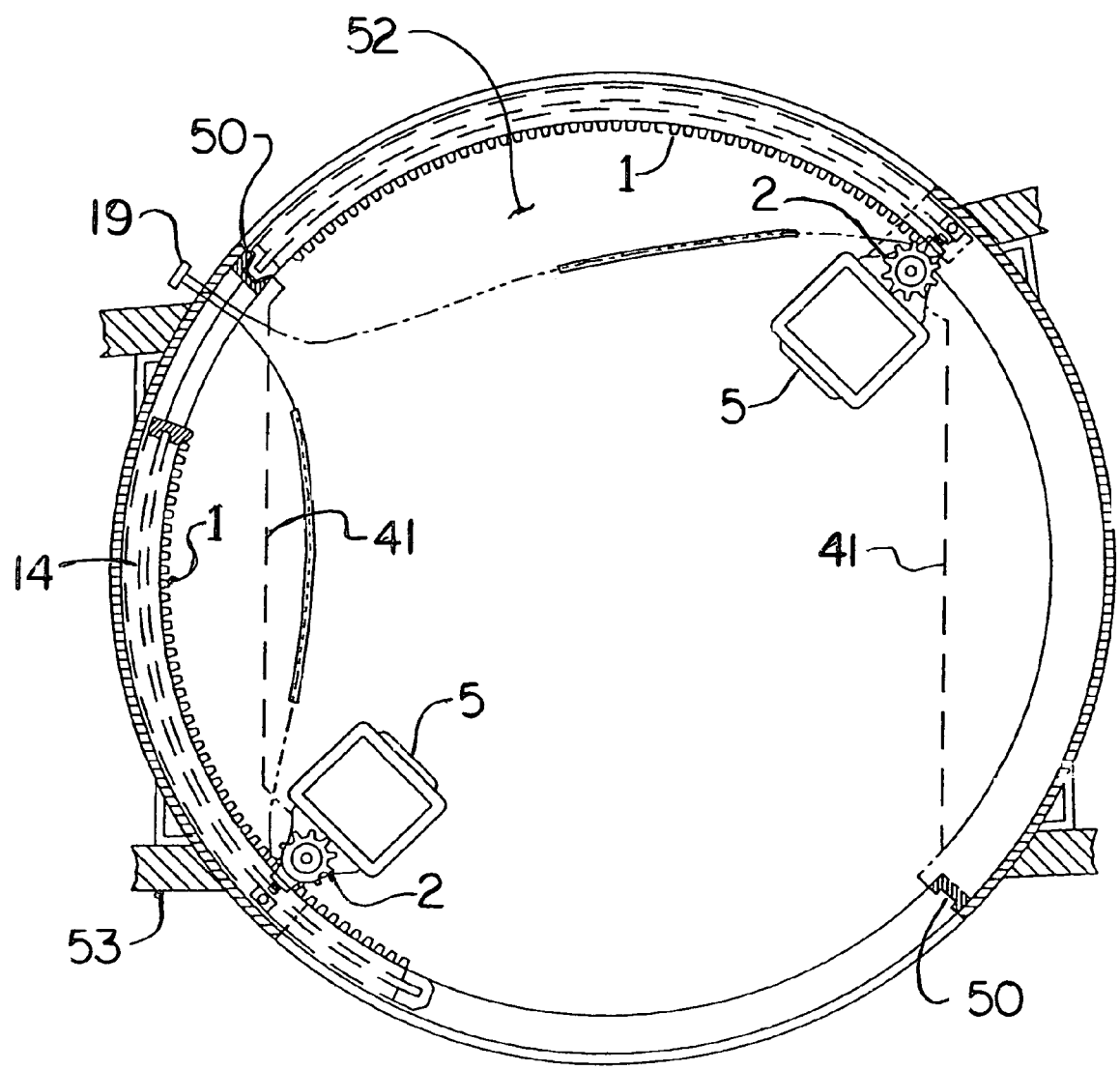
FIG. 11. Horizontal section with the top cover plate removed, showing the location of the two drive motors and the emergency manual door release cables, which are controllable solely from the secure portion of the aircraft.

FIG. 11 is the view down upon the ceiling plate 52, showing the motors 5 which, through a worm mechanism, drive the pinions 2 to activate the racks 1 which are attached to the doors 14 so as to propel them along their respective tracks in their excursion from fully closed (as is the door at the top of FIG. 11) through a partially open position (as is the door at the bottom of FIG. 11) to the fully open position when the door 14 is drawn to its maximum extent into the recess defined between the outer wall 17 and the intermediate wall 46. Also shown in FIG. 11 are the door stops 50 and the manual emergency release cables 19.

FIG. 12 is the view down on the floor plate 39 with part of the plate 39 cut away to show the lower drive shaft 3 carrying the lower pinion 2 which is engaged with the lower rack section 1 for driving the doors. The cut away view also shows the sub floor plate 37 and the floor support channel 40, which supports part of the floor plate 39.

FIG. 13 provides a view down upon the sub floor plate 37 showing the bearings 38 which support the lower drive shafts 3. The sub floor plate 37 is also supported by the floor support channel 40 and the floor support plates 55.

FIG. 14 provides a diagrammatic cross section, not to scale, of the cell fully assembled. From top to bottom, we see the top cover plate 18, the interior ceiling 52, the floor plate 39 and the sub floor plate 37. The door 14 is held in a frame 47(FIG. 9) which has arcuate upper 15 and lower 44 members, and to which are attached the rack sections 1. The upper portion of the arcuate upper frame member 15 is V-shaped to fit cooperatively with the inverted V of the arcuate upper track 16, while the lower portion of the arcuate lower frame member 44, is similarly V-shaped to fit cooperatively with the inverted V of the arcuate lower track 45. The frame members and track members are separated by small bearings 36 (FIG. 5) for smooth, positive movement throughout the excursions of the doors 14.

Figure 15:
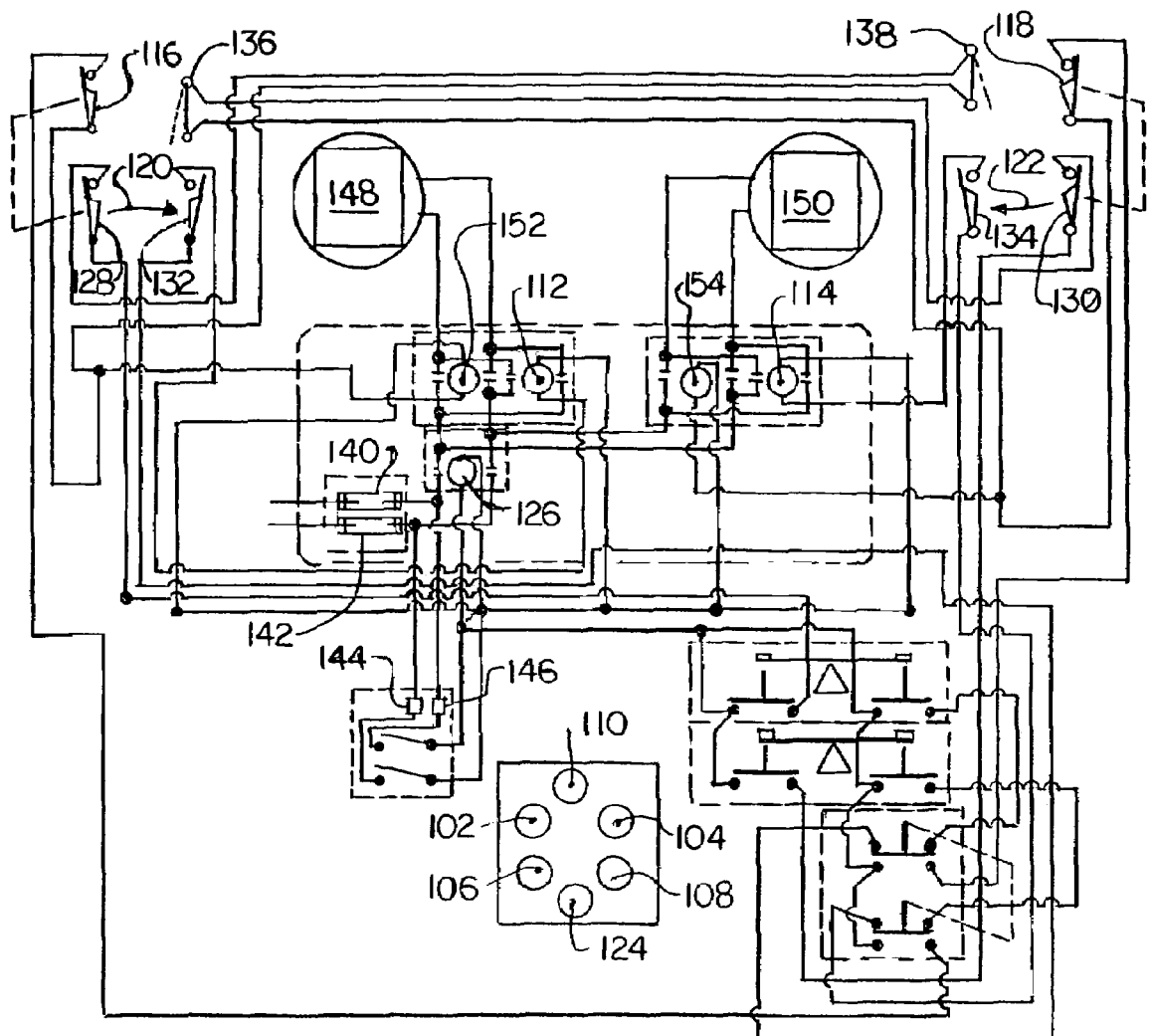
FIG. 15. Schematic diagram of the electrical control system of the security module.

FIG. 15 is an illustration of the Door Control Panel and Related Circuitry. The two push button switch for O1, 102, (Open first door), C1, 104, (Close first door), is a unit with two single contacts designed to operate alternately from close door to open door and vice-versa, contacts are normally open. The two push button switch for O2, 106, (open second door) and C2, 108, (close second door) is similar. The "E" Emergency control, 110, is DPDT with normally closed contacts that are in series with the two closed door solenoids C1, 112, and C2, 114. It has a large push button and when pressed in, will lock in, in the on position, for both doors to fully open until the Door Limit Switches, 116, 118, are contacted. The emergency switch is released by a slight turn of the button and it returns to normal position. This also reconnects the circuit so the doors can be closed. Arrows, 120, 122, indicate the direction for the doors to close. The emergency button is protected with a hinged cap lid designed to prevent accidental emergency button engagement.

The On-Off switch, 124, is a DPST which activates solenoid "P", 126, that connects current to the door motor controls. Each door has 3 limit switches. Two are SPST and one is DPST. The DPST D1LO, 128, and D2LO, 130, are for limiting door opening travel and individual door circuitry. The SPST D1LC, 132, and D2LC, 134, are for limiting the door closing travel. The other SPST switches, 136, 138, are close tolerance to the door opening preventing the other door from opening when one door is already open.

Except for the emergency switch, all push buttons are below the panel surface to inhibit accidental activation. Fuses or circuit breakers, 140, 142, are provided for Line 1 and similar mechanisms, 144, 146, are provided for Line 2 and also for the solenoid circuitry. Door motors M1, 148, and M2, 150, are reversible by the O1, 152, and C1, 112, and 02, 154, and C2, 114, solenoids. These motor controls are interlocking so that only one set of contacts at a time can close. No part of the circuitry is dependent upon any particular gravitational angle so that the door controls remain operable irrespective of G forces acting upon the aircraft.

Figure 16:
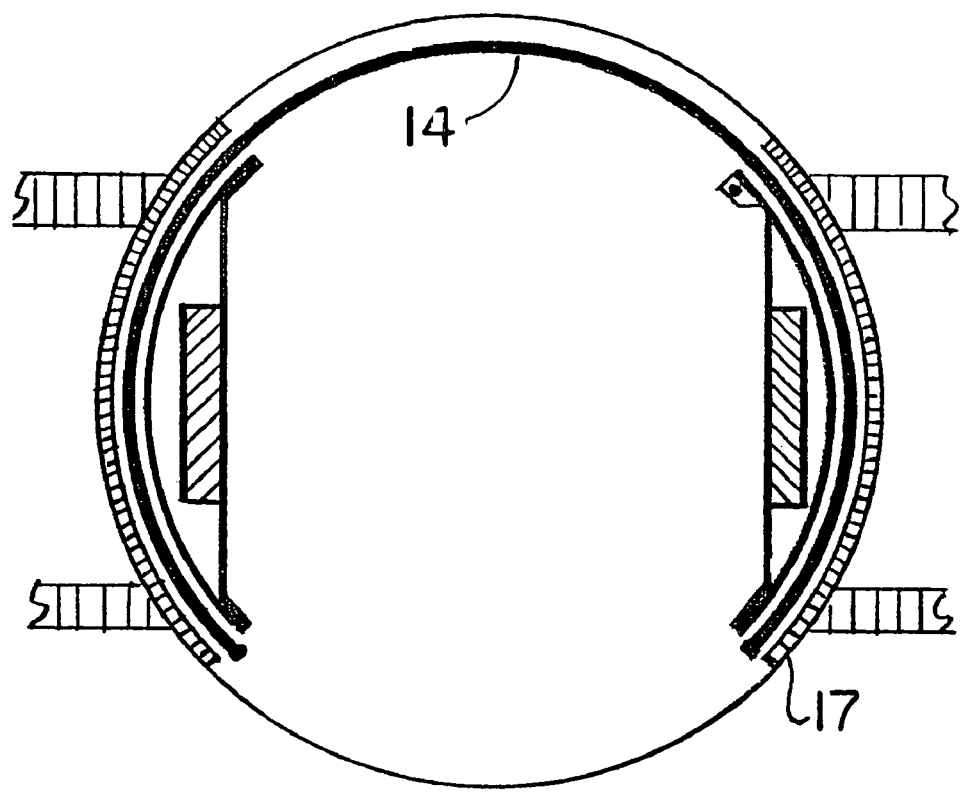
FIG. 16. Horizontal section illustrating a single door version of the security module in open and closed positions.
Figure 16:
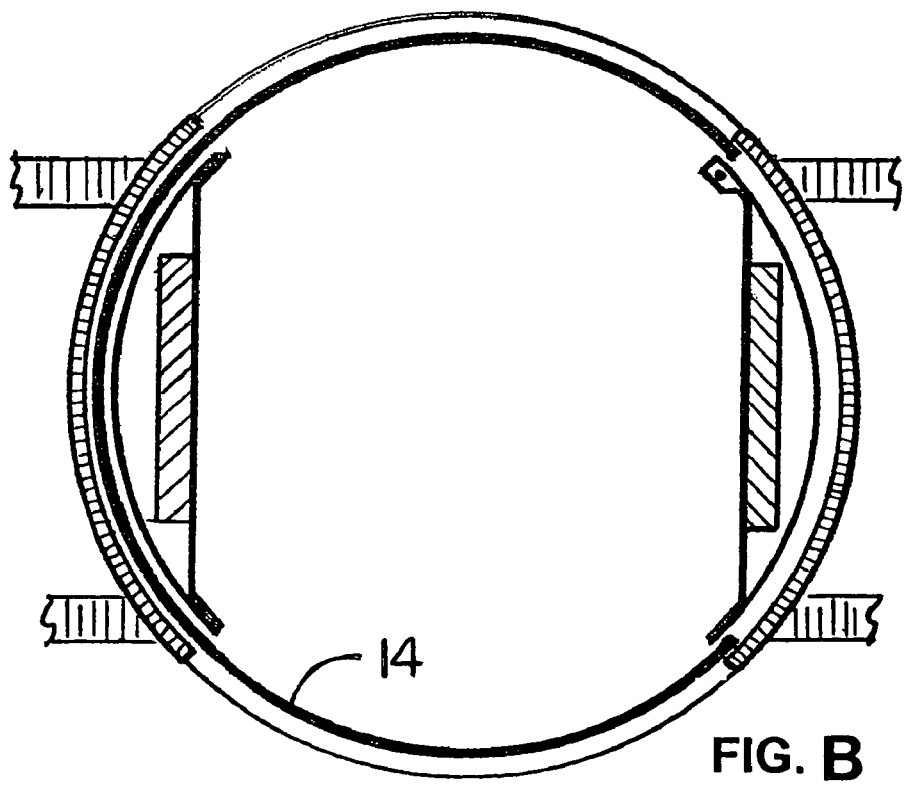

FIGS. 16(*a*) and (*b*) respectively show a single door version of our invention in the closed FIG. 16(*a*) and in one of the open FIG. 16 (*b*) positions. As shown, the door 14 extends through 270° of arc, whereas each of the two doors 14 as illustrated at FIGS. 2, 3, 10, 11, and 12, extend only through substantially 90° of arc. The exterior cylinder wall 17 is provided with two apertures in the same way as the two-door version above described, but the controls are arranged to drive the door 14 to three different positions: open to the cockpit, FIG. 16(*a*), closed, FIG. 16(*b*), and open to the cabin which is like FIG. 16(*a*) but with the door 14 rotated 180° from the position shown in FIG. 16(*a*). To admit a candidate, the door would be rotated so as to be open to the cabin, the candidate would enter the interior of the module and the door would be rotated to the closed position as shown in FIG. 16(*b*). After satisfactory examination of the candidate, the door would be rotated to the cockpit-open position and the candidate would be admitted to the cockpit.

We claim:

1. Security door system for installation in a passageway connecting a passenger compartment and a cockpit of an aircraft, comprising:

substantially cylindrical wall comprising an exterior wall and an interior wall defining within said wall a first aperture and a second aperture, said first aperture communicating between said passenger compartment and an interior cavity of said security door system, and said second aperture communicating between said interior of said security door system and said cockpit of said aircraft, first and second doors coextensive respectively with said first and second apertures in said wall, a plurality of powered traction means disposed within said security door system and at least one of said powered traction means having connection with each of said doors for selectively and independently withdrawing said first and second doors away from said first and second apertures into pockets defined between said exterior wall and said interior wall and said powered traction means further having connection with said doors for selectively drawing said first and second doors across said first and second apertures, respectively, control means electrically operable from within said cockpit for independently opening said first door for entry of a candidate into said interior cavity of said security door system, said control means additionally having means for closing said first door for enclosing said candidate within said security door system, said security door system further comprising means for evaluating said candidate with respect to whether said candidate is safe to permit into said cockpit, and said control means additionally having means for independently opening said second door for permitting said candidate to enter the said cockpit.

2. The security door system of claim 1 wherein said powered traction means includes for each door an electric motor driving a worm gear which drives a pinion which drives a rack fixed to said door whereby said door is driven for movement by operation of said electric motor, but movement of said door cannot be effected from within said cylindrical security door system because of braking action of said worm gear.

3. The security door system of claim 1 wherein each of said doors is of arcuate cross section according to a predetermined radius corresponding to the radius of said substantially cylindrical wall, and said door is constrained for movement into and out of said pocket, at both top and bottom of said door.

4. The security door system of claim 1 wherein said means for selectively and independently withdrawing said doors from said apertures defined in said cylindrical wall, includes interlock means which precludes opening of either door if the other of said first and second doors is not securely closed in its corresponding aperture.

5. The security door system of claim 1 wherein said powered traction means includes manually activated disengagement means for separating a first drive shaft from a second drive shaft, and said manually activated disengagement means is operable exclusively from said cockpit.

\* \* \* \* \*